Figure 1:
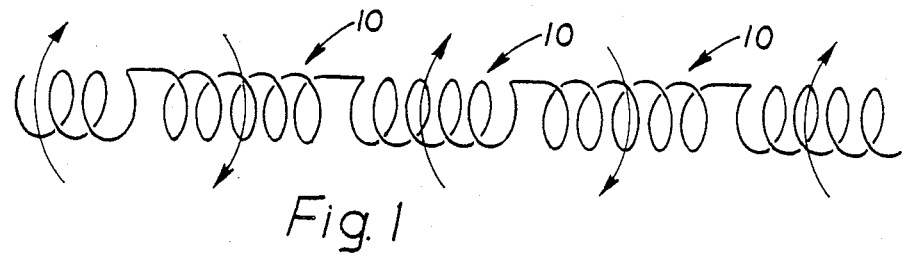

United States Patent [19]
Best et al.

[11] Patent Number: 4,544,905
[45] Date of Patent: Oct. 1, 1985

[54] LINEAR TRANSDUCERS

[75] Inventors: Christopher H. Best, Ashford; Alec H. Seilly, North Wembley, both of England

[73] Assignee: Lucas Industries Limited, Birmingham, England

[21] Appl. No.: 554,372

[22] Filed: Nov. 22, 1983

Related U.S. Application Data

[63] Continuation of Ser. No. 318,269, Nov. 4, 1981, abandoned.

[30] Foreign Application Priority Data

Nov. 18, 1980 [GB] United Kingdom ................ 8036999

[51] Int. Cl.$^4$ ............................................ H01F 21/06
[52] U.S. Cl. ..................................... 336/136; 336/181
[58] Field of Search ............... 336/130, 136, 171, 180, 336/181; 323/264, 347

[56] References Cited

U.S. PATENT DOCUMENTS

| | | | |
|---|---|---|---|
| 380,945 | 4/1888 | Shallenberger | 336/136 X |
| 2,149,336 | 3/1939 | Darnell | 336/136 X |
| 2,459,210 | 1/1949 | Ashcraft | 336/136 X |
| 2,507,344 | 5/1950 | MacGeorge | 36/136 X |
| 2,568,587 | 9/1951 | MacGeorge | 336/136 |
| 2,614,164 | 10/1952 | Huston | 336/136 X |
| 2,929,017 | 3/1960 | Seaton | 336/136 X |
| 3,210,746 | 10/1965 | Clapp | 336/136 X |
| 3,504,320 | 3/1970 | Engdahl et al. | 336/136 X |
| 3,517,362 | 6/1970 | Mead | 336/136 X |
| 4,297,698 | 10/1981 | Pauwels et al. | 336/136 X |

*Primary Examiner*—Thomas J. Kozma

[57] ABSTRACT

A linear transducer comprises a former about which is wound a number of windings, the windings being disposed in side by side relationship and having the same number of turns. The windings are connected in series with adjacent windings being wound in the opposite direction. The transducer also includes a core member which has a length substantially equal to the length of the winding. The inductance of the windings varies cylically as the core member is moved through the former.

6 Claims, 4 Drawing Figures

LINEAR TRANSDUCERS

This application is a continuation of application Ser. No. 318,269, filed Nov. 4, 1981, now abandoned.

This invention relates to electrical linear transducers.

Linear transducers are known which produce an analogue output and where the moving member varies some property, for example the inductance of a sensing device. Linear transducers are also known where changes in a property occur at specific intervals of the moving member so as to produce a digital output.

Transducers of the first type are affected by changes in the property of the sensing device due to environmental changes such as temperature changes which affect for example, the inductance. As a result the transducer can only be accurate if it is maintained at the temperature at which it was calibrated. If a temperature or other change takes place then a correction factor must be applied.

Transducers of the second type are often immune to changes in environmental factors such as temperature and pressure because in general they operate by noting an event and the absolute magnitude of the output is not critical. Some known types of digital transducers are however dependent upon a threshold velocity being maintained and are not therefore suitable for indicating the movement of a member whose speed of movement varies. Some transducers of this type are not suitable for operation in a hostile environment for example fuel oil because they are of an optical nature. Other transducers of this type are not suited to the long life required in for example an automotive application because they employ contacting members in sliding contact. Still other transducers of this type are physically incapable of being applied in a situation where for example the movement of a small piston is to be measured.

According to the invention an electrical linear transducer comprises a plurality of annular electrical windings each having the same number of turns and having the same axial length, the windings being disposed in side by side relationship, the windings being connected in series with adjacent windings being wound in the opposite direction, the transducer further including a core member movable axially within said windings, the arrangement being such that the inductance value of the inter-connected windings will vary in a cyclic manner as the core member is moved through the windings, the variation in the inductance providing an indication of the movement of the core member.

Figure 2:
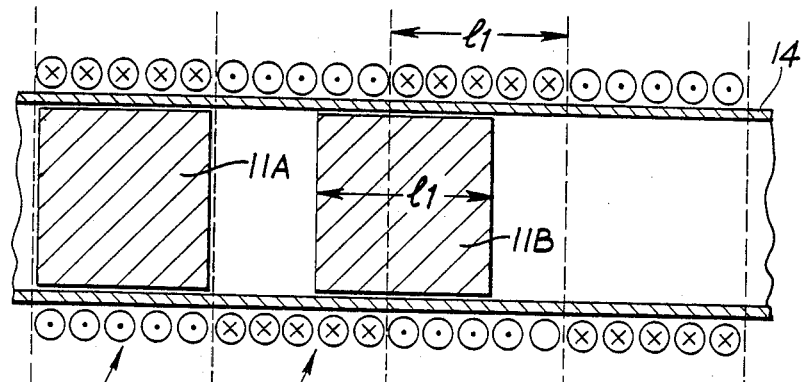
Figure 3:
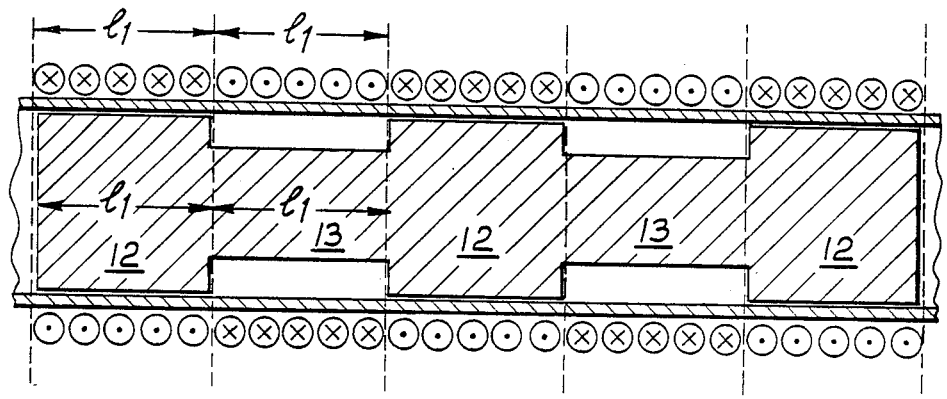
Figure 4:
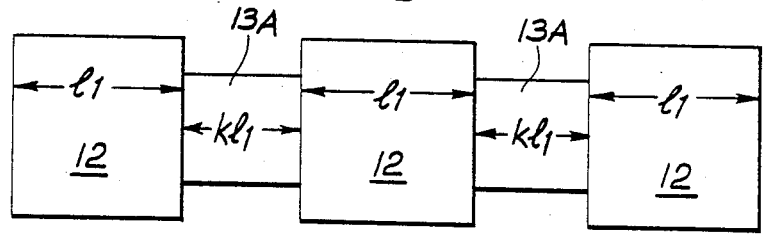

An example of a linear transducer in accordance with the invention will now be described with reference to the accompanying drawings in which:

FIG. 1 is a connection diagram of the windings,
FIG. 2 is a diagrammatic view of the transducer,
FIG. 3 is a view similar to FIG. 2 showing a modification and
FIG. 4 shows a modification of part of the transducer seen in FIG. 3.

Referring to FIGS. 1 and 2 the transducer comprises a plurality of annular windings 10 which are wound about a non-magnetic and preferably electrically insulating tubular former 14. Each winding has the same number of turns and is of the same axial length. As shown in FIG. 1, the windings are connected in series and the direction of winding of adjacent windings is in the opposite sense.

Also provided is a magnetisable core which is movable axially within the windings. In FIG. 2 the core is indicated at 11A in one position and at 11B in another position. The outer ends of the end windings are connected to a device which measures the inductance of the windings or produces an output signal which varies as the inductance of the windings. When the core is in the first position the inductance value presented by the windings is at a maximum and as the core is moved axially towards the right the inductance value will decrease to a minimum when the core is half-way out of the first winding and therefore half-way into the second winding. Further axial movement of the core will result in an increase in the inductance of the winding to substantially the original value followed by a further reduction in the inductance to substantially the previous minimum value. The two positions of the core shown in FIG. 2 correspond to the positions of maximum and minimum inductance. In use if the core starts from the left hand position which may be determined by a stop, then the position can be determined by counting the minimum and maximum values of the inductance as the core is moved.

The actual value of inductance which is measured, depends upon the inductance of the individual windings together with the mutual inductance between adjacent windings. If the number of windings were two then the total inductance value would be the sum of the inductance values of the two windings minus twice the mutual inductance between the windings. When the core is within one winding then the inductance value of that winding is materially increased whereas the inductance value of the other winding and also the mutual inductance value is not varied to any substantial extent. When however the core is between the windings whilst the inductance values of the two coils are approximately half the value obtained when the core is completely within the winding, the mutual inductance value is increased as compared with the value obtained when the core is in one winding only. The overall inductance value is therefore reduced.

In order to increase the inductance value a number of cores can be connected together as shown in FIG. 3 to form a single core. In FIG. 3 the single core has core portions 12 which are of the same axial length as the windings and have the same diameter as the core 11A, 11B seen in FIG. 2. The core portions 12 are inter-connected by core portions 13 of a smaller cross-sectional area. The same effect is achieved namely a cyclic variation of the inductance but the inductance value is larger. It will be appreciated with the arrangement shown in FIG. 3 that when the core starts to leave the windings then the overall inductance value will gradually fall.

A vernier effect can be obtained by modifying the core shown in FIG. 3 as shown in FIG. 4. In this modification the core portions 12 are of the same length as the windings but the core portions 13A have a reduced length. The cyclic variation of the inductance value is obtained as before but there are more variations. Instead of reducing the lengths of the core portions it is possible to increase them to obtain a similar effect.

The device which is responsive to the inductance of the windings may incorporate a conventional frequency modulated decoding circuit amplifier so the changes of inductance value appear as voltage changes at the output of the device.

The transducer is of particular use where the core is in the form of a cylindrical piston which is floating or movable in a hostile environment for example, fuel for diesel engines.

In some applications the piston may move in either direction and the need might arise to provide an indication of movement in each direction. In this case another set of windings may be employed which are axially spaced relative to each other at a position where the mutual inductance is at minimum. Phase comparison techniques may be employed to determine the direction of movement of the core.

The transducer may be utilised to calibrate the output of a normal analogue transducer which is responsive to the movement of the core or piston. This enables the normal analogue transducer to be employed for measurement but with an increased accuracy which can be gained by continuous re-calibration.

We claim:

1. An electrical linear transducer comprising: a tubular former having an axial extent, a plurality of windings on said former, said windings including only series connected windings and no primary and extending along the axial extent of said former, there being at least three windings, each of said windings having the same number of turns and an axial length with all of said winding axial lengths being equal and all adjacent windings being in non-overlapping side-by-side relationship on said former, said windings being wound so that immediately adjacent windings are wound in opposite directions; a cylindrical core member having an axial extent equal to the axial extent of each winding and positioned inside said tubular former to be movable axially of said former within said windings, said core member moving within said former causing the inductance of the transducer to vary from a maximum value when said core member is positioned entirely and coextensively within one of said windings to a minimum when said core member is positioned with one-half of said core member in one winding and one-half of said core member in a winding located immediately adjacent to said one winding so the inductance of the transducer varies cyclically as said core member moves axially through said former with the variation in inductance providing an indication of the extent of movement of said core member within said former.

2. A transducer according to claim 1 in which said core member comprises a plurality of interconnected and spaced sections, each of said sections having an axial length equal to the length of a winding.

3. A transducer according to claim 2 in which said sections are interconnected and spaced by further sections of smaller cross-sectional area.

4. A transducer according to claim 3 in which the axial length of each further section is equal to the length of a winding.

5. A transducer according to claim 3 in which the axial length of each further section is less than the length of a winding.

6. A transducer according to claim 3 in which the axial length of each further section is greater than the length of a winding.

* * * * *